United States Patent
Frippiat et al.

(10) Patent No.: US 9,046,188 B2
(45) Date of Patent: Jun. 2, 2015

(54) SOLENOID ACTUATOR WITH MAGNETIC SLEEVING

(71) Applicant: Techspace Aero S.A., Herstal (Milmort) (BE)

(72) Inventors: Cedric Frippiat, Jehanster (BE);
Jean-Christian Bomal, Melen (BE)

(73) Assignee: Techspace Aero S.A. (BE)

( * ) Notice: Subject to any disclaimer, the term of this patent is extended or adjusted under 35 U.S.C. 154(b) by 265 days.

(21) Appl. No.: 13/712,292

(22) Filed: Dec. 12, 2012

(65) Prior Publication Data

US 2013/0161546 A1     Jun. 27, 2013

(30) Foreign Application Priority Data

Dec. 23, 2011   (EP) .................................... 11195544

(51) Int. Cl.
*F16K 31/06* (2006.01)
*H01F 7/08* (2006.01)

(52) U.S. Cl.
CPC ............ *F16K 31/0675* (2013.01); *H01F 7/081* (2013.01)

(58) Field of Classification Search
CPC .............. F16K 31/082; F16K 31/0655; F16K 31/0675; H01F 7/08; H01F 7/081; H01F 7/122; H01F 7/1615
USPC ........ 251/62, 129.15; 335/229, 234, 256, 268
See application file for complete search history.

(56) References Cited

U.S. PATENT DOCUMENTS

| | | | |
|---|---|---|---|
| 3,178,151 A * | 4/1965 | Caldwell | 251/129.1 |
| 3,460,081 A * | 8/1969 | Tillman | 335/234 |
| 3,755,766 A | 8/1973 | Read, Jr. | |
| 3,814,376 A * | 6/1974 | Reinicke | 251/65 |
| 4,829,947 A | 5/1989 | Lequesne | |
| 5,127,585 A | 7/1992 | Mesenich | |
| 5,144,272 A | 9/1992 | Nishimura | |
| 5,787,915 A * | 8/1998 | Byers et al. | 137/1 |
| 6,903,647 B2 | 6/2005 | Linkner, Jr. et al. | |
| 7,066,154 B2 * | 6/2006 | Zdravkovic et al. | 123/516 |
| 7,511,475 B2 * | 3/2009 | Maerky et al. | 324/207.15 |

FOREIGN PATENT DOCUMENTS

FR     2713820 A1 *   6/1995   ................ H01F 7/17

OTHER PUBLICATIONS

International Search Report from corresponding EP 11 19 5544 filed May 22, 2012.

* cited by examiner

*Primary Examiner* — Matthew W Jellett
(74) *Attorney, Agent, or Firm* — Polster Lieder

(57) ABSTRACT

The present disclosure relates to an electromagnetic actuator. The actuator comprises a casing, a sleeve, coils, a permanent magnet, cores and a movable plunger. The present disclosure is unusual in that the sleeve is made of magnetic material. The sleeve enables a single component to mechanically and hydraulically isolate the plunger from the coils. The sleeve is also made of a material having a lower saturation induction than that of the materials used in other parts of the magnetic circuit. The actuator is also suitable for incorporation into a submerged cryogenic valve.

14 Claims, 4 Drawing Sheets

SOLENOID ACTUATOR WITH MAGNETIC SLEEVING

CROSS-REFERENCE TO RELATED APPLICATIONS

This application claims the benefit, under 35 U.S.C. §119, of EP 11195544.9, filed Dec. 23, 2011, the disclosure of which is incorporated herein by reference in its entirety.

FIELD

The present teachings relate to a solenoid actuator, more particularly, to a bistable electromagnetic actuator, a valve equipped with a bistable electromagnetic actuator and a vehicle equipped with a bistable electromagnetic actuator.

BACKGROUND

The statements in this section merely provide background information related to the present disclosure and may not constitute prior art.

A bistable electromagnetic actuator can be used to control a mechanism by means of a short duration current/voltage pulse. This type of actuator typically comprises one or more coils, a plunger, a permanent magnet and a casing with two cores, one at either end of the plunger. This actuator enables the plunger to be kept in position against one or the other of the two cores without continuously supplying a control current, thanks to the permanent magnet. Actuators of this type can be used to make rapid changes in position, generate high forces and have long strokes. These features can be combined as a function of the coil and the current supplied to it.

This type of actuator is particularly suitable for the production of valves. An actuator in a cryogenic valve, for example, is subject to high thermal and mechanical loads. Fluid pressure makes great demands on the materials and can lead to breakdown. Temperature differences generated by the fluid cause the material to expand as the temperature can vary from a few degrees kelvin (K.) to over 473° K. When several materials with different coefficients of expansion are in contact, differential expansion adds to the mechanical stress in the materials.

U.S. Pat. No. 5,127,585 discloses a high-pressure fuel injection valve comprising a bistable electromagnetic actuator. The magnetic actuator comprises a needle which is connected to a plunger located in a field generated by two coils and a permanent magnet sandwiched between the coils. Nonmagnetic sleeves are located inside the coils which house the magnetic poles, directing the magnetic flux to the plunger. This type of actuator enables fluid flow to be controlled precisely, allowing the valve to be opened for a short duration while working at high pressure.

U.S. Pat. No. 3,755,766 discloses a bistable electromagnetic actuator. It comprises a cylindrical body in which there is a coil that houses a plunger that is free to move in translation. The actuator further comprises a spring and a permanent magnet arranged axially so as to hold the plunger in position in either one of its two equilibrium positions. A sleeve is mounted in the actuator separating the plunger and the coil. This type of actuator is used to move the plunger from one position to another that is a long distance away, and to keep the plunger in position without supplying any power. This actuator includes a sleeve with low magnetic permeability. The plunger is held in one position by means of a spring, which adds a component and increases the size of the actuator.

U.S. Pat. No. 4,829,947 discloses a bistable electromagnetic valve actuator. The actuator comprises two concentric coils between which there is an annular permanent magnet. A plunger, movable in translation, is mounted in the center of the coils and the permanent magnet. A thin sleeve is fixed to the internal face of the permanent magnet to better distribute the magnet flux and to protect it mechanically.

U.S. Pat. No. 5,144,272 discloses an electromagnetic actuator comprising a coil in which two cores are located and a movable plunger inserted into the cores. The actuator further comprises a sleeve made of magnetic material extending over only a portion of the coil so as to direct the magnetic field towards the plunger.

U.S. Pat. No. 6,903,647 discloses a valve with an electromagnetic actuator which comprises a coil in which a sleeve, consisting of two part-sleeves nested one inside the other is located; one part-sleeve is magnetically permeable, the other not. This feature creates a discontinuity in the magnetic field or air gap.

Generally, for the actuators described above, one or more pieces of nonmagnetic material are usually placed around the air gap between the cores and the plunger to avoid magnetically short circuiting the air gap. Locating this or these piece(s) of nonmagnetic material side by side with the ferromagnetic parts of the sleeve or the casing requires a complex stack of parts which can make its manufacture expensive, particularly when the actuator is to be sealed.

SUMMARY

The present disclosure is intended to suggest an actuator to solve at least one of the problems above. More particularly, the present disclosure aims to propose an actuator whose efficiency is improved. The present disclosure also aims to increase the compactness and/or reduce the mass of the magnetic actuator. The present disclosure also aims to propose an actuator whose production costs can be reduced.

The present disclosure relates to an electromagnetic actuator comprising a plunger of a ferromagnetic material, able to move in translation in a given direction, a sleeve surrounding the plunger and extending in the direction of translation of the plunger, a solenoid device positioned around the sleeve and capable of producing a magnetic field, wherein the sleeve comprises a ferromagnetic material extending continuously over the length of the solenoid device and/or the plunger in at least one stable position of the plunger, so as to allow a portion of the magnetic field to pass along the sleeve parallel to the plunger.

That part of the magnetic field passing along the sleeve parallel to the plunger does not pass through the plunger and therefore does not generate any force. The actuator preferably comprises a casing made of ferromagnetic material, suitable for directing the magnetic field towards the plunger. It can comprise one or two cores aligned with the plunger and forming one or two air gaps with it. The stable position(s) of the plunger is/are those where the plunger is in contact with at least one of the cores. The sleeve extends along the length of least one of the air gaps.

The sleeve can be made mainly of ferromagnetic material. Its wall is preferably mostly, more preferably exclusively, made of ferromagnetic material. The solenoid device advantageously comprises at least one solenoid wound around the plunger along its direction of translation.

According to an advantageous embodiment of the present disclosure, the material and/or the dimensions of part of the sleeve are selected so that the fraction of the magnetic field passing through the sleeve corresponds to less than 50%, preferably 30%, more preferably 20% of the field. Advantageously, the sleeve is made predominantly, preferably completely, of ferromagnetic material.

According to another advantageous embodiment of the present disclosure, the sleeve is made of alloy having a saturation induction less than that of the main ferromagnetic material.

According to yet another advantageous embodiment of the present disclosure, the sleeve material has a saturation induction less than that of the plunger material, preferably less than 90%, more preferably 80%, even more preferably 70% of that of the plunger material.

According to yet another advantageous embodiment of the present disclosure, the sleeve extends beyond the solenoid device, more preferably beyond both ends of the device.

According to yet another advantageous embodiment of the present disclosure, the actuator comprises a permanent magnet so as to create a bistable actuator.

According to yet another advantageous embodiment of the present disclosure, the actuator comprises a casing made of ferromagnetic material surrounding the solenoid device, the casing being configured to guide the magnetic field to the plunger and part of the sleeve.

According to yet another advantageous embodiment of the present disclosure, the sleeve is integral over its entire length and comprises a shoulder or a mounting flange at one end.

According to yet another advantageous embodiment of the present disclosure, the sleeve is sealed at one end, preferably at the end opposite to the end comprising a shoulder or a mounting flange.

According to another advantageous embodiment of the present disclosure, the plunger is in direct contact with the sleeve.

According to yet another advantageous embodiment of the present disclosure, the material(s) between the solenoid and the plunger is/are made of predominantly ferromagnetic material(s).

According to yet another advantageous embodiment of the present disclosure, the actuator comprises at least one core positioned laterally to the plunger, at least one of the cores being positioned in the sleeve and at least one of the cores being made of ferromagnetic material of higher saturation induction than that of the sleeve material or a portion thereof.

According to yet another advantageous embodiment of the present disclosure, the actuator comprises two cores, one on either side of the plunger.

According to yet another advantageous embodiment of the present disclosure, the actuator is a monostable or bistable actuator.

The present disclosure also relates to a valve for a fluid such as a cryogenic fluid, comprising an actuator wherein the actuator is in accordance with the present disclosure.

According to yet another advantageous embodiment of the present disclosure, the actuator is configured so that fluid can enter the interior of the sleeve and be in contact with the plunger.

According to yet another advantageous embodiment of the present disclosure, the housing, the plunger and/or the core(s) are made of an iron cobalt (FeCo) alloy, or an iron nickel (FeNi) alloy, or an iron silicon alloy, or of soft iron, or any other.

According to yet another advantageous embodiment of the present disclosure the casing and sleeve comprise parts extending axially and radially, the axially extending parts being thinner than the radially extending parts.

The proposed present disclosure enables a more compact and efficient actuator to be made. The sleeve made of ferromagnetic material avoids having to make seals (using gaskets or welding or some other means) between the different materials to create nonmagnetic zones at the air gaps. This type of actuator is particularly suitable for the production of sealed cryogenic valves where differential thermal expansions and/or internal pressures can be substantial, leading to state of the art models requiring a thicker sleeve, or even proving infeasible to construct. This type of actuator is therefore a preferable solution for a state of the art actuator.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1:
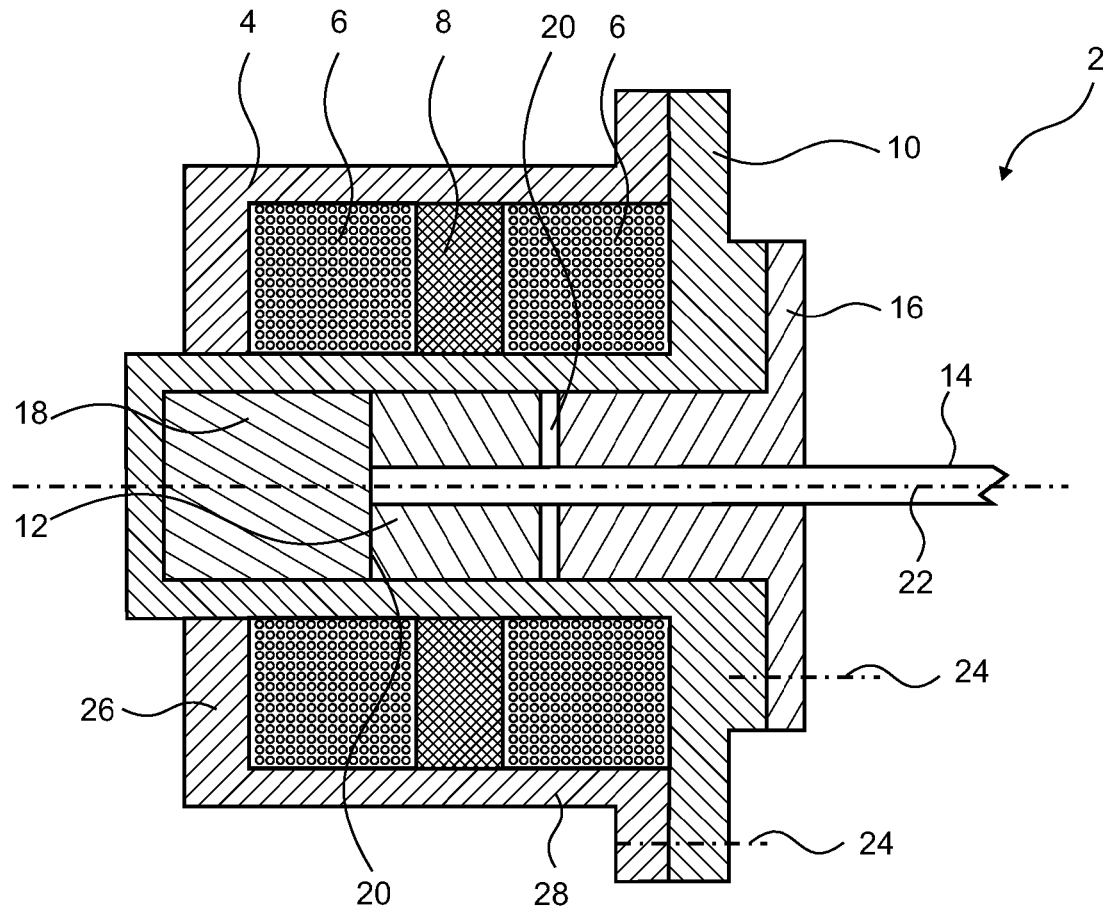
FIG. 1 shows a section of an actuator in accordance with various embodiments of the present disclosure.

The following description is merely exemplary in nature and is in no way intended to limit the present teachings, application, or uses. Throughout this specification, like reference numerals will be used to refer to like elements.

FIG. 1 shows a section of an actuator 2. The actuator 2 is essentially a cylindrical part symmetrical about an axis 22 and extending mainly along the axis 22. The actuator 2 comprises a solenoid device with two coils 6 for generating a magnetic field when they are energized. The coils 6 each comprise a coil of insulated conducting wire wound in turns around a cylinder. Current flowing in the wire generates the magnetic field.

The actuator 2 additionally comprises a casing 4 also made of ferromagnetic material. In the presence of a magnetic field, the casing 4 tends to magnetize. The casing 4 has a cylindrical shape and comprises two parts, namely a radial portion 26 extending along a radial plane perpendicular to the axis 22, and a cylindrical portion 28 extending along the axis 22. The radial portion 26 has at its center a circular opening. In contrast to the radial portion 26, the cylindrical portion 28 is open along the whole of the inside of the cylinder. From this open face, the cylindrical portion 28 can include a radial projection. The radial portion 26 and the cylindrical portion 28 being substantially perpendicular, the casing 4 has a shape predominantly equivalent to that generated by revolving an "L" shape about the axis 22.

The actuator 2 further comprises a sleeve 10 made of ferromagnetic material. The sleeve 10 comprises an inner part with a wall-shaped tube extending within the casing 4.

The actuator 2 also comprises a permanent magnet 8. The magnet 8 forms part of the magnetic circuit. The magnet 8 is placed in the toroidal volume. The magnet 8 is ring-shaped and its axis coincides with the axis 22. The magnet 8 is positioned between the two coils 6. The magnet 8 is positioned within the magnetic circuit and maintains a magnetic field even when the coils 6 are no longer producing a magnetic field.

The actuator 2 additionally comprises a plunger 12. The plunger 12 is made of ferromagnetic material and is free in translation along the axis 22 between at least two positions. The plunger 12 can intercept a magnetic flux and transform it into a force. Particularly, since the plunger 12 is mobile it will translate in a direction controlled by the difference in magnetic flux across its faces. A magnetic flux can move it in one direction or the other through reversing the magnetic field by changing the electric current in one or both of the coils 6.

The plunger 12 has a circular section with a radius equal to the inside diameter of the inner part of the sleeve 10. The plunger 12 is in contact with the sleeve 10 and slides on its inner surface. Alternatively, the external diameter of the plunger 12 is materially smaller than the inner diameter of the inner portion of the sleeve 10.

At the contact zone and along the full stroke of the plunger 12 the sleeve 10 can comprise a surface treatment or the addition of a film of a polymeric material, such as Teflon to reduce friction.

Still further, the actuator 2 comprises at least two cores 16 and 18 comprising ferromagnetic materials. The cores 16 and 18 are positioned at either end of the plunger 12 and act as stops limiting the travel of the plunger 12. Alternatively, the core 18 may not be present (i.e. the core and the sleeve can be made in one piece).

The cores 16 and 18 are inserted in the internal part of the sleeve 10 and comprise circular sections and extend axially along the axis 22. There are air gaps 20 between the plunger 12 and the cores 16 and 18.

The actuator 2 has a bistable nature in that the plunger 12 can remain in position against a core 16 or 18 even when the coils 6 produce no magnetic field. The magnet 8 can maintain a flux in the magnetic circuit that keeps the plunger 12 in position.

To move the plunger 12 again, it is necessary that a current passes through one or both of the coils 6, generating a magnetic field whose lines of flux form a loop around the coils and pass through the permanent magnet 8.

The present disclosure is advantageous in that the sleeve 10 is made of a material of lower saturation induction than that of the casing 4, the plunger 12 and the cores 16 and 18. In this way, short-circuiting the air gap is limited and performance is improved.

The present disclosure is also unusual in that it enables the use of a single piece, namely the sleeve 10, to separate the plunger 12 and the coils 6. This construction avoids stacks of materials that would have to be welded. Welding is a manufacturing process that can locally damage one piece, which can lead to early mechanical failure. To combat this potential early failure it would be necessary to over-specify the parts, which would increase the weight of the actuator 2.

In various embodiments, the sleeve 10 can be made of a ferromagnetic material having a saturation induction of between 0.50 and 1.50 Tesla, for example between 0.60 and 1.10 Tesla, for example between 0.70 and 1.00 Tesla. The choice of the saturation induction of the sleeve 10 is a compromise, since it is desirable that it be large enough to pass the magnetic flux through the sleeve 10 between the core 18 and the casing 4 without needing to increase its length. On the other hand, it is desirable that the saturation induction is not too high so as not to short-circuit the air gaps between the cores 16 and/or 18 and the plunger 12.

The alternative, in which the outer core 16 extends radially so as to come into contact with the cylindrical portion 28 of the casing 4, means that the magnetic circuit is improved as the outer core 16 can direct more magnetic flux than the sleeve 10 at the junction with the cylindrical portion 28 of the casing 4.

In various embodiments, the actuator 2 can be used in a valve. The valve includes the actuator 2 on which is mounted a rod 14 fixed to the plunger 12 at one of its ends. The other end of the rod 14 can be connected to a flow control mechanism such as a valve that opens or closes an orifice. The rod 14, preferably made of nonmagnetic material, protrudes from the valve through a hole bored in the outer core 16 along the axis 22.

Seals can be used at the junction between the core 16 and the sleeve 10. The seals can be O-rings positioned where the two parts join and which are pressed together during assembly using such means 24 as screws.

Note that the valve can dispense with seals between the shaft 14 and the outer core 16 as the liquid can penetrate the sleeve 10 without disturbing the coils 6. This aspect simplifies design, improves compactness and requires no changes of shape that might distort the magnetic flux.

Figure 2:
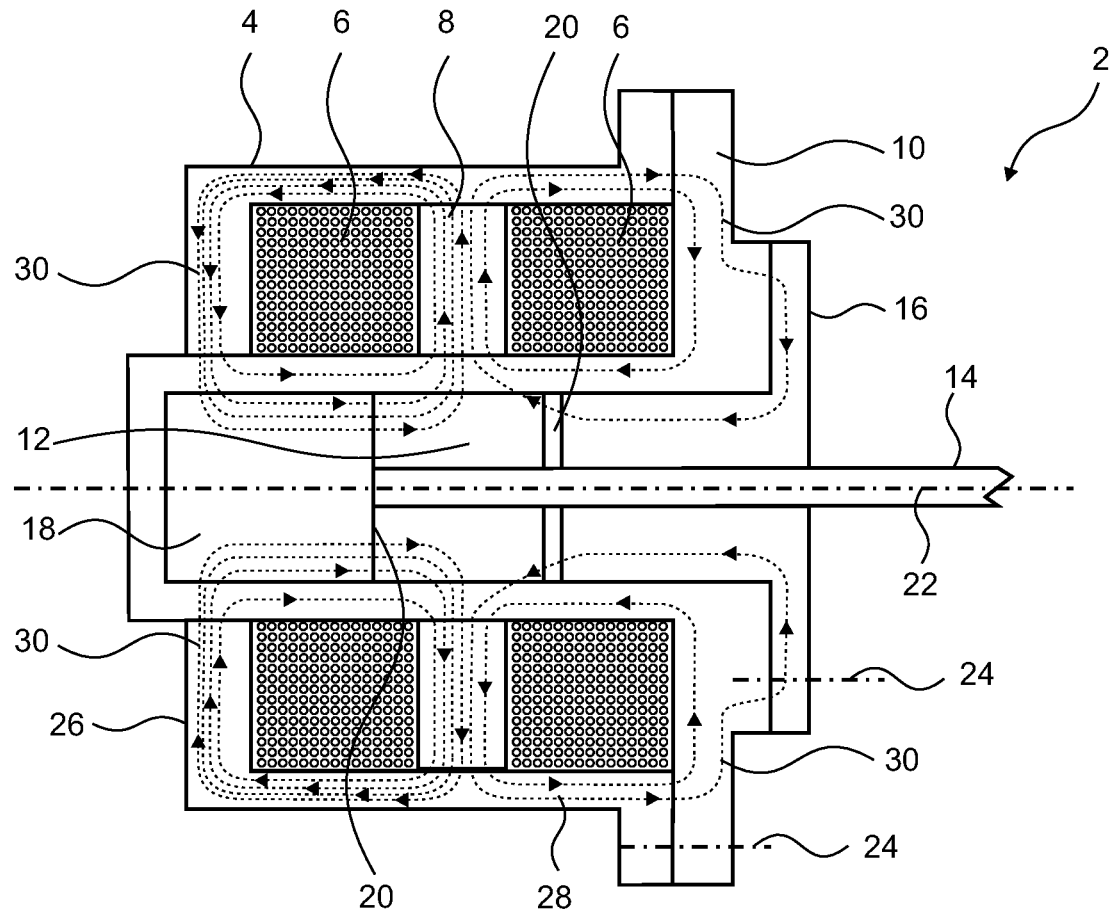
FIG. 2 shows the lines of magnetic flux in the actuator shown in FIG. 1 in a first stable position when the coils are not energized, in accordance with various embodiments of the present disclosure.

FIG. 2 shows the lines of magnetic flux 30 created in the actuator 2 in a first stable position of the plunger 12, the coils 6 not being energized. The lines of flux 30 are shown in dotted lines and their direction is indicated with arrows. This figure also illustrates the magnetic flux density by the number of lines of flux 30 shown on one side or other of the magnetic circuit.

Despite the absence of current in the coils 6, a magnetic flux is generated in the circuit because of the magnet 8. This magnetic flux passes through the entire circuit. The magnetic flux passes through the casing 4 and is split into two directions. In the first direction, through which the majority of the flux flows, the flow enters the face of the plunger 12 which remains in a stable position. To do this, the magnetic flux passes mostly through the inner part of the sleeve 10 to enter the inner core 18 from the blind side of the sleeve 10, and then passes through the plunger 12, finally re-crossing the sleeve 10 to return to the magnet 8. Note that most of the flux passes through the inner core 18 in preference to the sleeve 10 because of its thickness and its saturation induction, if this is reached. A smaller fraction of the field does not pass through the inner core 18 and remains in the inner cylindrical part of the sleeve 10 before returning to the magnet 8.

In the second direction, through which the minority of the flux flows, the flux enters the opposite face of the plunger 12. The magnetic flux leaves the casing 4 and passes through the outer portion of the sleeve 10 to pass into the outer core 16, on the face adjacent to the sleeve 10. The magnetic flux then returns to the magnet 8 through the inner part of the sleeve 10 with a small proportion passing through the plunger 12. A small part of the magnetic flux remains within the sleeve 10 and returns directly to the magnet 8.

These descriptions of the paths that are taken assuming that the north pole of the magnet 8 is next to the casing 4 and the south pole at the sleeve 10. The poles can be reversed and, in this case, the directions of the paths followed by the lines of flux 30 just described should be reversed.

The magnetic flux flows mainly in the inner core 18 such that the air gap 20 between it and the plunger passes more flux than the air gap situated on the other side, adjacent to the outer core 16. Consequently, the plunger 12 is subject to a force pressing it against the inner core 18, which is a first stable position of the plunger 12. This stable position is maintained by the magnet 8 without the coils 6 being energized.

Figure 3:
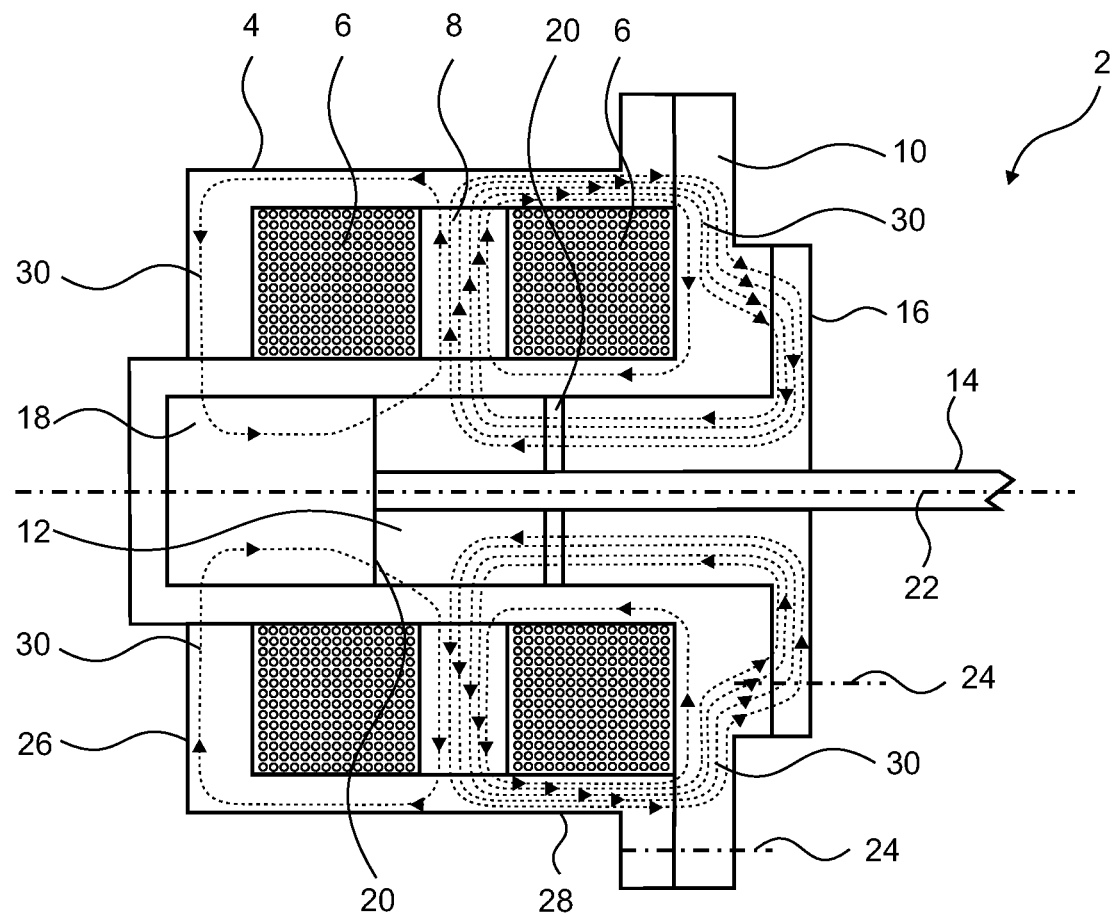
FIG. 3 shows the lines of magnetic flux in the actuator shown in FIG. 1 when the coils are energized, in accordance with various embodiments of the present disclosure.

FIG. 3 shows the lines of flux 30 induced in the actuator 2 when at least one of the coils 6 is energized, the plunger 12 being in its first stable position.

Figure 4:
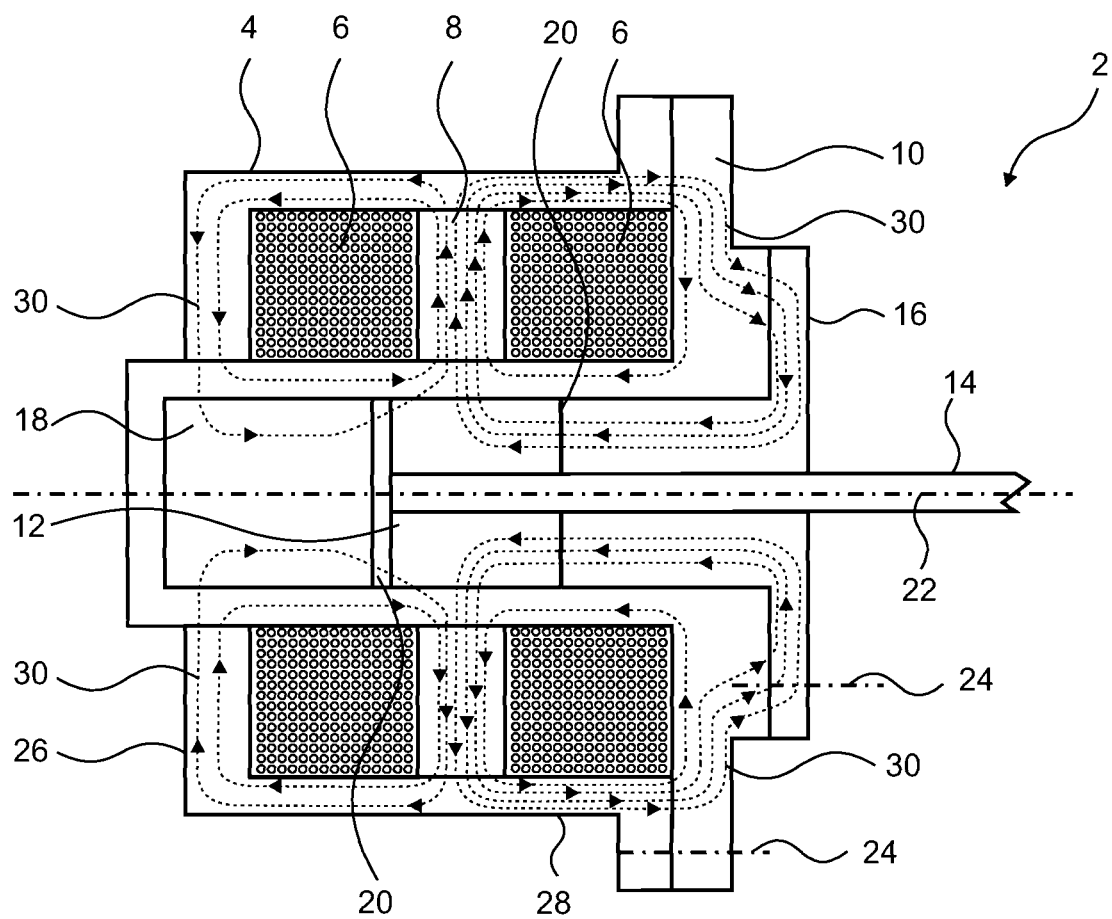
FIG. 4 shows the lines of magnetic flux in the actuator shown in FIG. 1 in a second stable position when the coils are not energized, in accordance with various embodiments of the present disclosure.

FIG. 4 shows the lines of flux 30 induced in the actuator 2 in a second stable position of the plunger 12, the coil 6 of the actuator 2 being no longer energized. Compared to FIG. 3, we see that the flow through the outer core 16 decreases.

When the coils 6 are not energized, magnetic flux is once again generated in the circuit by the magnet 8. Its magnetic flux passes through the casing 4 and is split into two directions. In the first direction, through which the majority of the flux passes, most of the magnetic field passes through the plunger 12. To do this, the magnetic flux exits from the casing 4 and passes through the sleeve 10 at its outer portion to enter the outer core 16 and pass along the plunger 12, finally recrossing the sleeve 10 to return to the magnet 8. A smaller fraction of the field exits from the casing 4 and does not enter the inner core 16, but passes down the blind side of the sleeve 10 and remains within it until returning to the magnet 8.

In the second direction, through which the minority of the flux flows, the magnetic flux enters the opposite side of the plunger 12. The magnetic flux passes through the sleeve 10 to enter the internal core 18. The magnetic flux then returns to the magnet 8 through the inner part of the sleeve 10 with a small proportion passing through the plunger 12. A small part of the magnetic flux remains within the sleeve and returns directly to the magnet 8.

The magnetic flux flows mainly in the outer core 16 due to the other air gap 20, located on the side of the inner core 18. Therefore the plunger 12 is subject to a force pressing it against the inner core 16, which represents a second stable position for the plunger 12. The stable position is maintained by the magnet 8 without the coils 6 being energized. This second stable position gives the actuator its bistable characteristic.

Generally, it should be noted that the coils 6 can have different lengths and/or different diameters and/or different numbers of turns and/or different wire. The two coils 6 can be replaced by a single coil 6 creating the magnetic field. The use of two coils caters for the failure of one of them and provides the required safety when being used, for instance, in the field of aeronautics.

Note also that the present disclosure is not limited to a bistable actuator. It is equally applicable to a monostable actuator.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. An electromagnetic actuator comprising:
   a plunger made of ferromagnetic material, able to move in translation in a given direction;
   a sleeve surrounding the plunger and extending in the direction of translation of the plunger;
   a solenoid device positioned around the sleeve, suitable for generating a magnetic field;
   a casing made of ferromagnetic material surrounding the solenoid device, the casing being configured to guide the magnetic field towards the plunger and the sleeve;
   wherein the sleeve comprises a ferromagnetic material extending continuously over the length of at least one of the solenoid device and the plunger in at least one stable position of the plunger, so as to allow part of the magnetic field to pass along the sleeve in parallel to the plunger; and
   wherein the material of the sleeve has a saturation induction that is less than 80% of a saturation induction of the material of the plunger and the casing.

2. The electromagnetic actuator according to claim 1, wherein a fraction of the magnetic field passes through the sleeve, at least one of the material and dimensions of the sleeve are selected so that the fraction of the magnetic field passing through the sleeve corresponds to less than 50% of the magnetic field.

3. The electromagnetic actuator according to claim 1, wherein the ferromagnetic material of the sleeve has a saturation induction that is less than 60% of the saturation induction of the ferromagnetic material of the plunger.

4. The electromagnetic actuator according to claim 1, wherein the sleeve extends beyond at least one end of the solenoid device.

5. The electromagnetic actuator according to claim 1, wherein a permanent magnet is positioned around the sleeve, the solenoid device comprising two coils positioned on either side of the permanent magnet.

6. The electromagnetic actuator according to claims 1, wherein the sleeve is integral over its entire length and comprises one of a shoulder and a mounting flange at one end of said sleeve.

7. The electromagnetic actuator according to claim 1, wherein the sleeve is sealed at one end of said sleeve.

8. The electromagnetic actuator according to claim 1, wherein the plunger is in direct contact with the sleeve.

9. The electromagnetic actuator according to claim 1, wherein material is present between the solenoid device and the plunger, said material being made of predominantly ferromagnetic material.

10. The electromagnetic actuator according to claim 1, wherein at least one core is positioned laterally against the plunger, the at least one core being located in the sleeve, the at least one core being formed of a ferromagnetic material of higher saturation induction than that of the material of the sleeve.

11. The electromagnetic actuator according to claim 10, wherein two cores are positioned on either side of the plunger.

12. The electromagnetic actuator according to claim 1, wherein the actuator is one of bistable or monostable.

13. A valve for a fluid such as a cryogenic fluid, said valve comprising an actuator comprising:
   a plunger made of ferromagnetic material, able to move in translation in a given direction;
   a sleeve surrounding the plunger and extending in the direction of translation of the plunger;
   a solenoid device positioned around the sleeve, suitable for generating a magnetic field;
   a casing made of ferromagnetic material surrounding the solenoid device, the casing being configured to guide the magnetic field towards the plunger and the sleeve and the casing;
   wherein the sleeve comprises a ferromagnetic material extending continuously over the length of at least one of the solenoid device and the plunger in at least one stable position of the plunger, so as to allow part of the magnetic field to pass along the sleeve in parallel to the plunger; and
   wherein the material of the sleeve has a saturation induction that is less than 80% of a saturation induction of the material of the plunger.

14. The valve according to claim 13, wherein the actuator is configured so that a fluid can enter an interior of the sleeve and be in contact with the plunger.

\* \* \* \* \*